March 19, 1935.　　　J. Q. HOLMES　　　1,994,995
INDEXING DEVICE
Filed Aug. 12, 1933　　　3 Sheets-Sheet 1

INVENTOR
John Q. Holmes
BY
Spencer Hardman & Fehr
his ATTORNEYS

March 19, 1935.　　　J. Q. HOLMES　　　1,994,995
INDEXING DEVICE
Filed Aug. 12, 1933　　　3 Sheets-Sheet 2
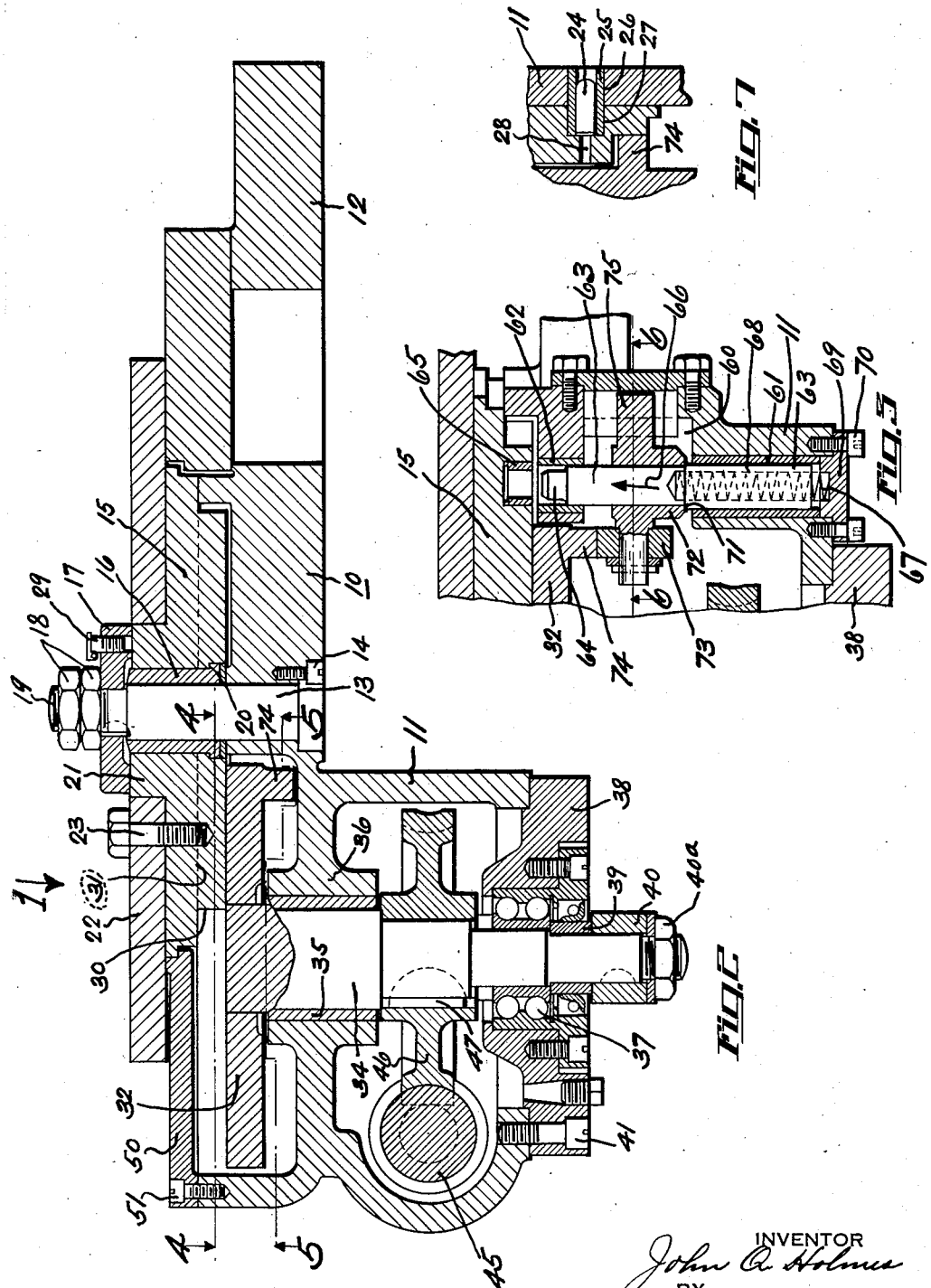

March 19, 1935.  J. Q. HOLMES  1,994,995
INDEXING DEVICE
Filed Aug. 12, 1933   3 Sheets-Sheet 3
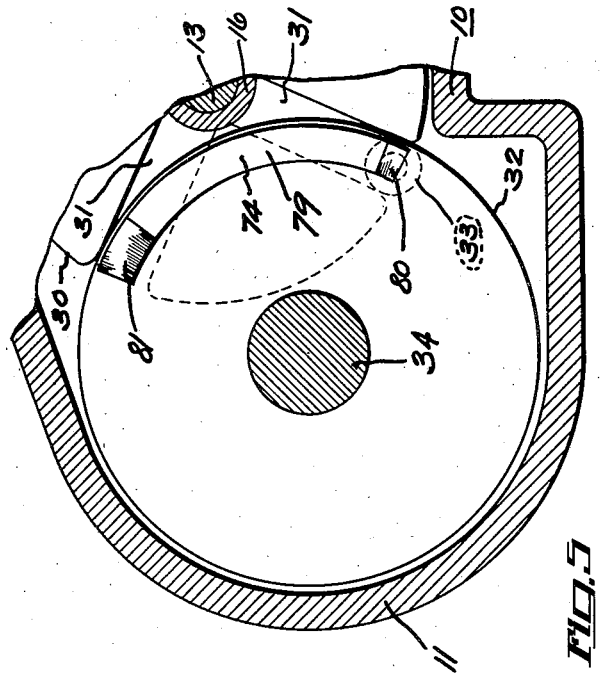
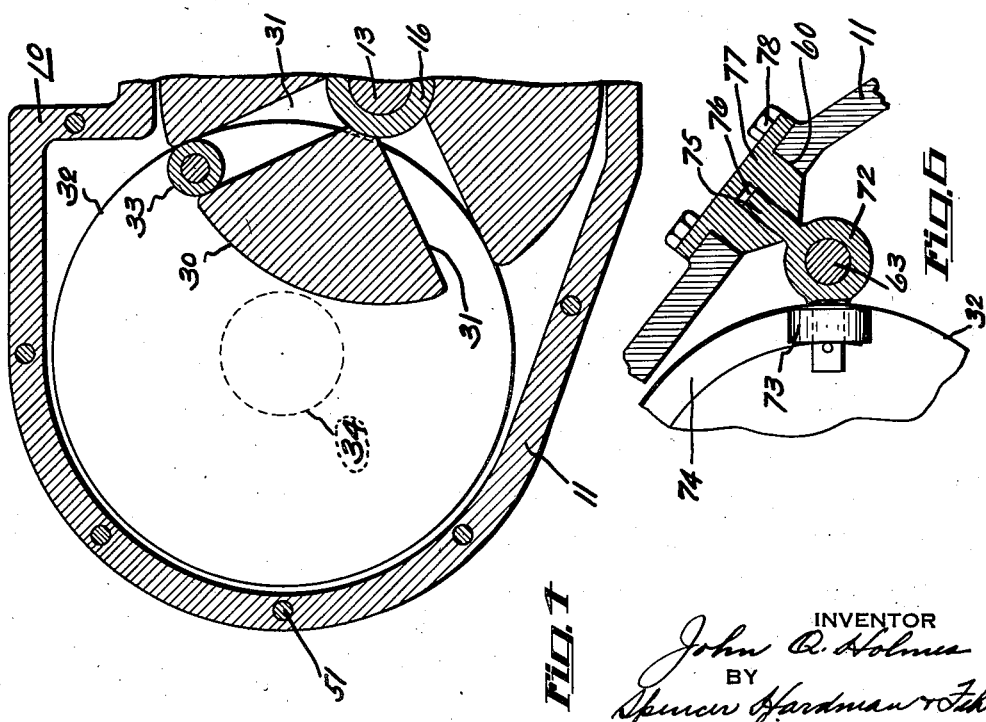
INVENTOR
John Q. Holmes
BY
Spencer Hardman Fehr
his ATTORNEYS Patented Mar. 19, 1935

1,994,995

UNITED STATES PATENT OFFICE 1,994,995

INDEXING DEVICE

John Q. Holmes, Anderson, Ind., assignor, by mesne assignments, to General Motors Corporation, Detroit, Mich., a corporation of Delaware Application August 12, 1933, Serial No. 684,810

10 Claims. (Cl. 74—436)

This invention relates to devices for imparting intermittent motions to a machine element such as a work conveyor and more particularly to means for locking and accurately positioning the intermittently moved machine element between stop periods.

The Geneva wheel, which is frequently employed for the indexing of a machine element has well known provisions for locking the same, but even though it is locked thereby, the machine element still has a certain degree of play which necessitates the provision of accurate positioning means apart from the locking provisions on the Geneva wheel. As for instance in the case of a work conveyor which is adapted to convey work into certain stations to be operated upon by tools or other means at these stations, it still is the ordinary practice to provide a plurality of reciprocable pilots which cooperate with bushings in the work conveyor. Aside from the fact that such pilots are apt to be worn considerably due to the fact that frequently they have to move the entire work conveyor slightly in order to register with the bushings therein, such pilots obstruct a clear view of the work conveyor and oftentimes of the tools and furthermore give rise to injuries to the operator of the machine. It is therefore obvious that the thus applied pilots are responsible for three distinct disadvantages, namely, considerable wear of the pilots, obstruction of a clear view of the work on the work conveyor and of the work conveyor itself, and the immediate possibilities of injuries to the operator of the machine.

It is an object of the present invention to provide a positioning device especially for work conveyors which overcomes the above mentioned disadvantages.

This object is accomplished by providing a positioning device which also performs the function of the well known Geneva wheel locking provision, thus rendering the latter obsolete, and by locating this device in such manner that it is well hidden from view and out of reach of the operator.

Further objects and advantages of the present invention will be apparent from the following description, reference being had to the accompanying drawings wherein a preferred embodiment of one form of the present invention is clearly shown.

In the drawings:

Fig. 2 is a section taken along the line 2—2 of Fig. 1.

Fig. 3 is a fragmentary sectional view taken along the line 3—3 of Fig. 1.

Fig. 4 is a fragmentary sectional view taken along the line 4—4 of Fig. 2.

Fig. 5 is a fragmentary sectional view taken along the line 5—5 of Fig. 2.

Fig. 6 is a fragmentary sectional view taken along the line 6—6 of Fig. 3.

Fig. 7 is a sectional view taken along the line 7—7 of Fig. 1.

Figure 1:
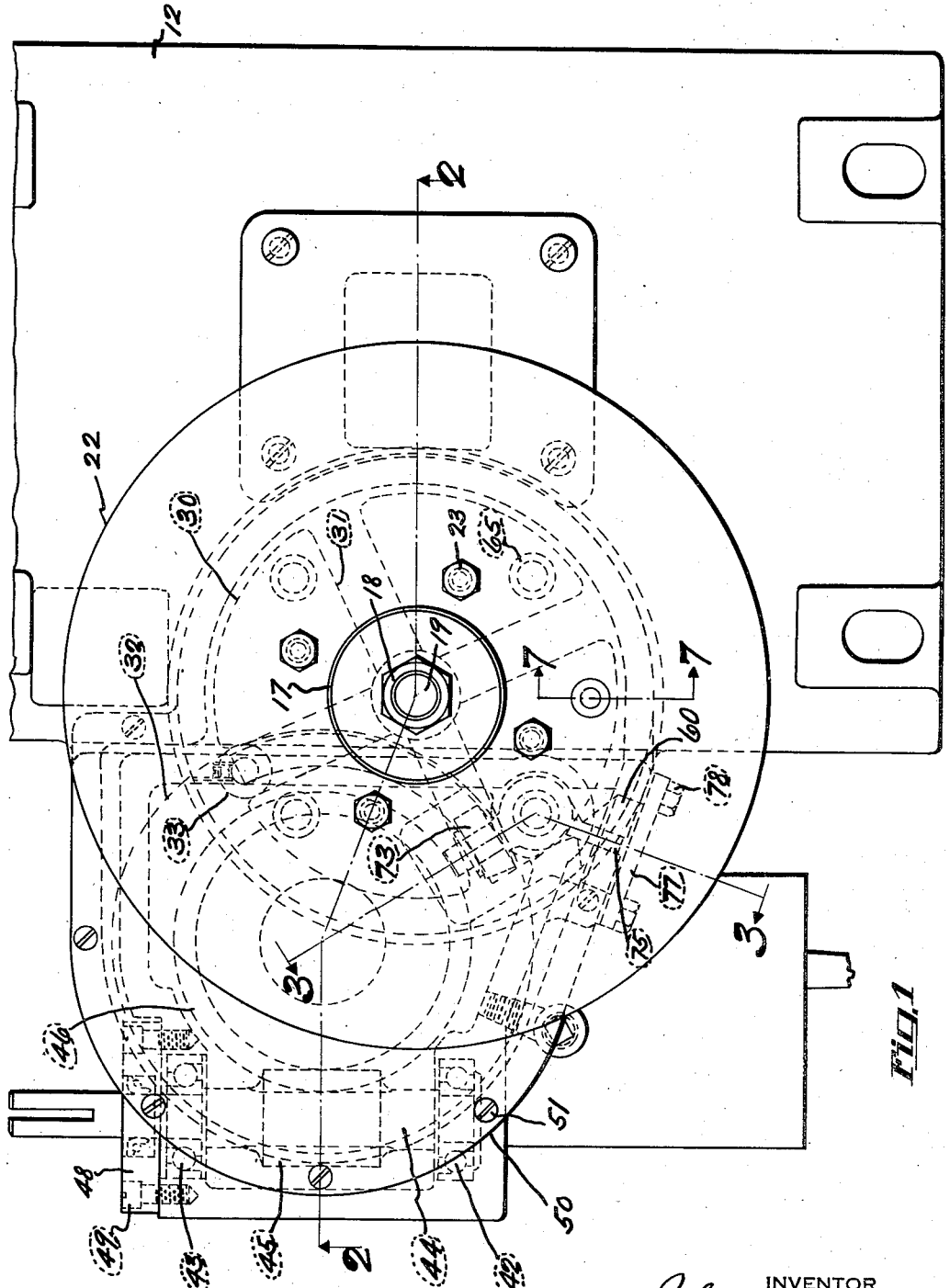
Fig. 1 is a plan view of a work conveyor, showing the drive therefor and a novel locking and positioning device.

Referring more particularly to the drawings, the reference numeral 10 designates a frame divided into a casing 11 and a supporting plate 12 which is normally mounted on a suitable place of a machine as for instance the bolster plate of a punch press. A stub shaft 13, keyed to the supporting plate 12 of the frame by a screw 14 extends beyond said supporting plate and rotatably supports a Geneva driven wheel 15 to which is pressfitted a bushing 16 surrounding said extending stub shaft portion. A retaining member 17 is clamped against the wheel 15 by nuts 18 which are threaded over a reduced end 19 of stub shaft 13, whereby the wheel is maintained in engagement with a shoulder 20 of the bushing 16. Received by a cylindrical reduced portion of the Geneva driven wheel 15 is a work conveying disc 22 which is bolted to said wheel 15 as at 23 and which is properly positioned relative thereto by one or more dowel pins 24, received by a bushing 25 which, as shown in Fig. 7, is press-fitted into aligned bores 26 and 27 of the work conveying disc and the Geneva driven wheel, respectively. A small hole 28 in wheel 15 is provided for the purpose of venting bushing 25 when the dowel pin 24 is forced therein. An oil nipple 29 occasions the lubrication of stub shaft 13.

The Geneva driven wheel 15 is of the standard type with the exception that it does not have the arch-shaped recesses for locking purposes, instead the periphery 30 intermediate the driving grooves 31 of the driven wheel 15 is truly cylindrical. Cooperating with the Geneva driven wheel is a Geneva driver 32 of conventional design, having a roller 33 which is adapted to cooperate with the grooves 31 of the Geneva driven wheel in order to index the same. This Geneva driver 32 is attached in any suitable manner to an end portion of another stub shaft 34 which is journaled in a bushing 35, provided by a transverse rib 36 of casing 11, and in a ball bearing 37, one race of which is screwed to a cover plate 38 which is attached to the casing 11 by a plurality of screws 41. A retainer 39 retains the other race of ball bearing 37 in proper position by means of a spacer 40 and a nut 40a which is received by a reduced end portion of stub shaft 34.

Journaled in ball bearings 42 and 43, provided by the casing 11 as shown in Fig. 1, is a shaft 44 which is provided with a worm 45, meshing with a worm gear 46 which is keyed as at 47 to stub shaft 44 intermediate the bearings 35 and 37. Ball bearing 43 is retained in proper position by a bearing retainer 48 which is attached to the casing 11 by screws 49. Motion from any suitable mechanical power means, such as a motor (not shown), is imparted in any suitable manner to that end of shaft 44 which extends beyond the casing 11, and through the worm gearing 45, 46 such motion is transmitted to the Geneva driver 32 which in the well known manner indexes the Geneva driven wheel and therewith the work conveying disc 22. A cover 50, attached by screws 51 to the casing 11, closes said casing so as to prevent the operator from getting caught and possibly injured by the roller of the rotating Geneva driver.

Referring more particularly to Figs. 3, 5 and 7, the casing 11 is provided with a lateral cut-out 60 and two axially aligned pressfitted bushings 61 and 62. Slidable in said bushings is a cylindrical bar 63, having a pilot head 64 which is adapted to cooperate with one of a plurality of equi-angularly spaced pilot bushings 65 pressfitted into the wheel 15. In the present instance the Geneva driven wheel 15 has four equi-angularly spaced radial grooves 31 which provide for intermittent one quarter revolutions of the same, hence during one complete revolution of the Geneva driven gear the same stops intermittently four times and it is obvious that four pilot bushings are provided. Bar 63 is normally urged in the direction of arrow 66 by a compression spring 67, located in a recess 68 of said bar and bearing against a spring retainer 69 which is attached to the casing 11 by screws 70. Resting against a shoulder 71 of bar 63 is a member 72, carrying an anti-friction roller 73 which is constantly urged into engagement with an arc-like cam 74, integral with the Geneva driver 32. This member 72 has a lateral extension 75 which is received by a groove 76 of a guide member 77, attached to the casing 11 by screws 78 as best shown in Fig. 6. This groove 76 extends parallel to the coaxes of the bushings 61 and 62 so that member 72 is free to move parallel to said coaxes together with bar 63 but cannot rotate relative to said bar. The cam 74 which is more clearly shown in Fig. 5 is so arranged, that during intermittent motions of the Geneva driven wheel 15 the cam lobe 79 maintains the pilot head 64 of bar 63 out of engagement with the pilot bushings 65 in wheel 15, and upon arrival of the Geneva driven wheel 15 into the next intermittent rest station, the cam descent 80 permits bar 63 to move in the direction of arrow 66 under the compression of spring 67, at which time one of the pilot bushings 65 is in axial alignment with the pilot head 64 so that the latter may enter the bushing and properly position the Geneva driven gear and therewith the work conveying disc 22. When the roller of the Geneva driver is about to enter the consecutive groove 31 of wheel 15, the cam ascent 81 forces the pilot head 64 out of engagement with the pilot bushing so that the Geneva driven gear is free to rotate. It follows from the preceding description that the coordinated cam 74, member 72, bar 63 with its pilot head 64 and the pilot bushings 65 not only lock the Geneva driven wheel but furthermore accurately position the same. Furthermore the entire coordinated structure is built into a closed casing and therefore not hindering the operator of the machine in the performance of his work.

While the form of embodiment of the present invention as herein disclosed, constitutes a preferred form, it is to be understood that other forms might be adopted, all coming within the scope of the claims which follow.

What is claimed is as follows:

1. In combination with Geneva wheels, a pilot reciprocable parallel to the axes of rotation of the Geneva wheels and normally urged toward the Geneva driven wheel; a plurality of equi-angularly spaced bushings in the Geneva driven wheel and flush with an end surface thereof, the pilot being adapted to register with said bushings; and means including a part carried by the Geneva driving wheel for withdrawing the pilot from registry with a bushing immediately before the Geneva driven wheel is indexed.

2. In combination with Geneva wheels, a pilot reciprocable parallel to the axes of rotation of the Geneva wheels and normally urged toward the Geneva driven wheel; a plurality of equi-angularly spaced bushings in the Geneva driven wheel, and flush with an end surface thereof, the pilot being adapted to register with said bushings; and means including a cam on the Geneva driving wheel for withdrawing the pilot from registry with a bushing immediately before the Geneva driven wheel is indexed.

3. In combination with Geneva wheels, an open casing rotatably supporting the Geneva wheels and being substantially closed thereby; a pilot in the casing, said pilot being reciprocable parallel to the axes of rotation of the Geneva wheels and normally urged toward the Geneva driven wheel; a plurality of equi-angularly spaced bushings in the Geneva driven wheel and flush with an end surface thereof, the pilot being adapted to register with said bushings; and means including a cam on the Geneva driving wheel for withdrawing the pilot from register with a bushing immediately before the Geneva driven wheel is indexed.

4. In combination with Geneva wheels, a reciprocable pilot having a shoulder and being normally urged toward the Geneva driven wheel; a plurality of equi-angularly spaced pilot bushings in the Geneva driven wheel; a member slidably mounted on the pilot, said member bearing against the shoulder and having an arm projecting at right angles to the pilot axis; a roller journalled on said arm; a cam on the Geneva driving wheel cooperating with the roller to cause the pilot to reciprocate in such manner that the same registers with a pilot bushing during intermittent stops of the Geneva driven wheel; and means for preventing rotation of the member relative to the pilot.

5. In combination with Geneva wheels, a reciprocable pilot having a shoulder and being normally urged toward the Geneva driven wheel; a plurality of equi-angularly spaced pilot bushings in the Geneva driven wheel; a first member slidably mounted on the pilot, said member bearing against the shoulder and having two arms projecting at right angles to the pilot axis; a roller journalled on one of said arms; a cam on the Geneva driving wheel cooperating with the roller to cause the pilot to reciprocate in such manner that the same registers with a pilot bushing during intermittent stops of the Geneva driven wheel; and a second member having a straight groove extending parallel to the pilot axis and receiving the other arm of the first member so that the latter is free to move parallel to the pilot axis but prevented from rotating relative to the pilot.

6. In combination with Geneva wheels, a reciprocable pilot having an annular shoulder; a spring urging the pilot toward the Geneva driven wheel; a plurality of equi-angularly spaced pilot bushings in the Geneva driven wheel; a first member slidably mounted on the pilot and having two arms projecting at right angles to the pilot axis; a roller journalled on one of said arms; a cam integral with the Geneva driving wheel and cooperating with the roller to retract the pilot from the Geneva driven wheel and to permit the spring to move the pilot toward said wheel in such manner that the pilot registers with a pilot bushing during intermittent stops of the Geneva driven wheel, the spring and the shoulder of the pilot urging the member toward the cam; and a second member having a straight groove extending parrallel to the pilot axis and receiving the other arm of the first member so that the latter is free to move parallel to the pilot axis but prevented from rotating relative to the pilot.

7. In combination with Geneva wheels, a pilot reciprocable parallel to the axes of rotation of the Geneva wheels and normally urged toward the Geneva driven wheel; a plurality of equi-angularly spaced bushings in the Geneva driven wheel and flush with an end surface thereof, the pilot being adapted to register with said bushings; and means actuated in response to rotation of the Geneva driving wheel for withdrawing the pilot from registry with a bushing immediately before the Geneva driven wheel is indexed.

8. In combination with Geneva wheels, a pilot reciprocable parallel to the axes of rotation of the Geneva wheels and normally urged toward the Geneva driven wheel; a plurality of equi-angularly spaced bushings in the Geneva driven wheel and flush with an end surface thereof, the pilot being adapted to register with said bushings; and means carried by the Geneva driving wheel for withdrawing the pilot from registry with a bushing immediately before the Geneva driven wheel starts to rotate, and for releasing the pilot in withdrawn position immediately before the Geneva driven wheel comes to a stop.

9. In combination with Geneva wheels, a pilot reciprocable parallel to the axes of rotation of the Geneva wheels and normally urged toward the Geneva driven wheel; a plurality of equi-angularly spaced bushings in the Geneva driven wheel and flush with an end surface thereof, the pilot being adapted to register with said bushings; and means including a cam on the Geneva driving wheel for withdrawing the pilot from registry with a bushing immediately before the Geneva driven wheel starts to rotate, and for releasing the pilot in withdrawn position immediately before the Geneva driven wheel comes to a stop.

10. In combination with Geneva wheels, a pilot reciprocable parallel to the axes of rotation of the Geneva wheels and normally urged toward the Geneva driven wheel; a plurality of equi-angularly spaced bushings in the Geneva driven wheel and flush with an end surface thereof, the pilot being adapted to register with said bushings; and means actuated in response to rotation of the Geneva driving wheel for withdrawing the pilot from registry with a bushing immediately before the Geneva driven wheel starts to rotate, and for releasing the pilot in withdrawn position immediately before the Geneva driven wheel comes to a stop.

JOHN Q. HOLMES.